3,145,190
POST-CHLORINATED VINYL CHLORIDE POLYMER COMPOSITIONS HAVING INCREASED IMPACT STRENGTH AND IMPROVED PROCESSABILITY
George Gateff, Lakewood, and Edward J. Leeson, Lorain, Ohio, assignors to The B. F. Goodrich Company, New York, N.Y., a corporation of New York
No Drawing. Filed Nov. 16, 1962, Ser. No. 238,264
6 Claims. (Cl. 260—45.5)

This invention relates generally to thermoplastic polymer compositions which have good mechanical processing properties, high shock resistance and impact strength, high softening points, good heat resistance, and resistance to chemical attack. More particularly, this invention relates to novel, normally rigid, polymer blends comprising a major proportion of post-chlorinated polyvinyl chloride and a minor proportion of a rubber chlorinated polymer of isobutylene containing from about 12 to about 32 weight percent of chlorine.

Because of its heat stability, high softening temperature, dimensional stability, and corrosion and chemical resistance, post-chlorinated polyvinyl chloride is widely used in the manufacture of piping, ductwork, tanks, utensils, appliance and electrical components, automotive parts, and other rigid articles, especially where such products will handle or contact hot water and other hot, corrosive liquids, fumes, and gases. Post-chlorinated polyvinyl chloride is a thermoplastic resin that can be processed and formed by conventional techniques such as milling, calendering, extruding, laminating, compression molding, transfer molding, and the like, but not with the ease desired in commercial applications of these operations, especially in pipe extrusion and calendering, unless softening additives or plasticizers are incorporated therein to improve its processability. But, while improving processability, these additives produce other harmful effects; the compositions are very much more heat sensitive, considerably softer, weaker, and less desirable chemically and electrically than the orignal resin, thus limiting their field of usefulness in the manufacture of rigid plastic articles. In addition, while post-chlorinated polyvinyl chloride has more than adequate shock and impact resistance for mose uses, the physical abuse and shocks that pipe and ductwork often encounter require a higher impact strength than this material offers.

It is the object of this invention, therefore, to provide a novel thermoplastic composition which has the substantially unimpaired attributes of post-chlorinated polyvinyl chloride but which also possesses improved processability and shock resistance. Stated differently, it is the object of the present invention to provide a modified, high-impact, post-chlorinated polyvinyl chloride resin blend that is easily worked into useful shapes without such modification materially detracting from its other desirable physical properties. Further objects and advantages of the present invention will appear from the detailed description set forth below.

It has now been discovered that unplasticized post-chlorinated polyvinyl chloride polymers are rendered easily processable and made more shock resistant by incorporating therein small amounts of a rubbery chlorinated polymer of isobutylene having certain characteristics that will be defined hereinbelow. By "small amounts" is meant from about 3 to about 15 parts by weight of chlorinated polyisobutylene per 100 parts by weight of post-chlorinated polyvinyl chloride. It has been found that not only is the impact strength of the base resin increased by a multiple of from about 2 to 11, but improvements in processing are readily apparent. For example, a smooth bank and faster mixing are obtained on a roll mill; faster machine speeds, better roll release, and improved gloss are noted in calendering. Extruded objects have better surface qualities with production at faster rates. The resin has improved flow during forming and molding thereof. Lower processing temperatures are permitted in most operations.

The post-chlorinated polyvinyl chloride resins adaptable to modification according to the present invention have densities of approximately 1.43 to 1.65 gms./cc. at 25° C.; they are substantially insoluble in acetone and completely soluble in hot tetrahydrofuran. The chlorinated, vinyl chloride polymers emebodied herein are not degraded in the unmodified condition when heated in the air for at least 10 minutes at 3750 F. to 400° F. U.S. Patent No. 2,996,489 and pending U.S. application Serial No. 101,654 of Joseph C. Shockney, filed April 10, 1961, now U.S. Patent No. 3,100,762, describe these post-chlorinated polyvinyl chloride resins in considerable detail and give methods for their preparation. The post-chlorinated polyvinyl chlorides most useful in this invention are those having densities of approximately 1.53 to 1.59 gms./cc. at 25° C. (that is, those containing from about 64 to 68% by weight of chlorine) and heat distortion temperatures of from about 95° to 125° C., that is, at least about 20° C. higher than the heat distortion temperatures of unchlorinated polyvinyl chloride resins (ASTM test method D648-56). The most preferred post-chlorinated polyvinyl chloride resins have densities in the range of from about 1.55 to about 1.58 gms./cc. at 25° C. and heat distortion temperatures of at least 100° C.

Briefly stated, the compositions of our invention are comprised of an intimate mixture or blend of (a) 100 parts by weight of the aforesaid post-chlorinated polyvinyl chloride and (b) from 3 to 15 parts by weight of a rubbery chlorinated polymer of isobutylene which contains from about 12 to about 32 weight percent of chlorine, based on the weight of the halogenated polymer, and which is obtained by chlorination of an isobutylene polymer characterized by having a weight average Staudinger molecular weight of between about 8,000 and 200,000. The most preferred compositions, from the standpoint of exhibiting the highest shock resistance in addition to good processability, contain from about 5 to about 10 parts by weight of the chlorinated polyisobutylene per 100 parts by weight of the post-chlorinated polyvinyl chloride. The maximum impact strength for the modified chlorinated polyvinyl chloride resin is obtained with a chlorinated polyisobutylene additive having a chlorine content of from about 18 to 26 percent by weight.

By the terms "isobutylene polymer" and "polymer of isobutylene" are meant not only the homopolymer of isobutylene, i.e., polyisobutylene, but also the isobutylene copolymer rubbers containing at least 95 percent by weight of the hydrocarbon polymer as isobutylene constituent, the remainder being a monomer constituent copolymerizable with isobutylene. Representative copolymerizable monomers are a mono-unsaturated vinyl-type compound containing a $CH_2=C<$ grouping, such as styrene, acrylonitrile, methacrylonitrile, methacrylic acid, methyl methacrylate, and ethyl methacrylate; an olefinic-type compound such as butene; a conjugated diolefin such as butadiene, dimethyl butadiene, chlorobutadiene, piperylene, and especially isoprene. The preferred isobutylene copolymer rubbers contain between about 97 to 98 weight percent of isobutylene constituent and between about 2 to 3 percent of isoprene constituent.

The "isobutylene polymers" which are (after chlorination) suitable for use in our invention have a weight average Staudinger molecular weight of between about 8,000 and 200,000, preferably between about 50,000 and 150,000. The isobutylene copolymers are readily available, and are generally designated in the trade as "butyl" type rubbers. The polyisobutylenes are marketed under the trade name "Vistanex" by the Enjay Chemical Company. The commercial "Vistanex" polymers have a weight average Staudinger molecular weight in the range of from about 8,700 to about 135,000. The following grades are available:

| Vistanex: | Average Staudinger molecular weight range |
|---|---|
| MS | 8,700– 10,000 |
| MH | 10,000– 11,700 |
| L-80 | 64,000– 81,000 |
| L-100 | 81,000– 99,000 |
| L-120 | 99,000–117,000 |
| L-140 | 117,000–135,000 |

By "Staudinger molecular weight" is meant the weight average molecular weight obtained by the method devised by H. Staudinger, whose formula expresses molecular weight of rubber polymers as a linear function of intrinsic viscosity. The Staudinger method, as applied to polyisobutylenes, is discussed in detail in an article by P. J. Flory in the Journal of the American Chemical Society, volume 65, pages 372–382, 1943. It is known that the viscosity-molecular weight relationship for polyisobutylene is virtually identical with that for butyl rubber (see article by J. Rehner and P. Gray in Rubber Chemistry and Technology, volume 18, pages 887–895, 1945). Although the Staudinger molecular weights determined by the procedure described below may be reproduced with a high degree of accuracy, they are not to be regarded as true absolute molecular weight values, but only as the weight average molecular weight values conforming to a particular viscosity relationship.

The Staudinger molecular weight-viscosity relationship is expressed by the formula:

$$[n] = KM$$

where $[n]$ = intrinsic viscosity of the polymer in a solvent at a fixed temperature
$M$ = Staudinger molecular weight
$K$ = a constant for the particular polymer-solvent system employed.

The intrinsic viscosity is the limiting value of the ratio of the specific viscosity to the concentration of polymer at infinite dilution and is determined in the following manner. The "relative viscosity," i.e., the ratio of the viscosity of a solution of the polymer to the viscosity of the pure solvent, is determined at several different concentrations. The "specific viscosity" is equal to the relative viscosity minus one (1). The specific viscosity is divided by the concentration of the solution and these values are plotted against the corresponding concentration. The extrapolation of the resulting straight line to zero concentration provides the intrinsic viscosity value. For the preferred viscosity measurement system of polyisobutylene (or butyl rubber) in diisobutylene solvent, at a temperature of 20° C., the constant $K$ has the value $3.185 \times 10^{-5}$. Thus, the aforesaid Staudinger formula can be conveniently written as:

$$M = 31,400[n]$$

We have discovered that the properties of the rubbery chlorinated isobutylene polymer, with respect to its usefulness as an impact and processing improver for postchlorinated polyvinyl chloride, depend not only on the chlorine content of the polyisobutylene, but also on the method of chlorination employed. It is essential that the chlorinated polyisobutylene modifier have rubbery and elastic characteristics. Moreover, the characteristics of a soft rubber are preferred to those of a hard rubber.

Our polyisobutylene chlorination process is a modified version of the method described in United States Patent No. 2,327,517, which method is essentially a chlorination of the isobutylene polymer in solution in an inert solvent using gaseous elemental chlorine; the chlorination is further characterized by the absence of catalysis of the reaction by the usual chlorination catalysts, e.g., ultraviolet light, and other free-radical initiators. More particularly, we carry out the chlorination of the isobutylene polymers in the following manner.

The polymer is first dissolved in a suitable solvent which is inert to chlorine. Typical solvents are carbon tetrachloride, hexachlorethane, difluor-dichloromethane, hexane, cyclohexane, chloroform, ethylene dichloride, and the like. Carbon tetrachloride is the preferred solvent. The solution can contain from about 4 to about 20 weight percent of polymer, optimum results being obtained with about a 4 to 10% solution. The reaction vessel should be equipped with a stirrer since agitation increases the efficiency of the reaction, however, agitation is not essential. The chlorinator is equipped with suitable heating means. The solution is purged with nitrogen and heated to the desired temperature. The chlorination is carried out at from 20° to 100° C. with from about 50 to 70° C. being the preferred range of reaction temperatures. Gaseous chlorine is passed through the polymer solution at a rate sufficient to maintain a slight excess in the system. Reaction is evidenced by the evolution of hydrogen chloride gas. The degree of chlorination depends on the period of time within which the polymer solution is subjected to the chlorine treatment. This period generally ranges from about 15 to 60 minutes for the desired products. The chlorinated polymer is advantageously recovered from the solvent by precipitation with a lower aliphatic alcohol such as methanol, or other oxygenated non-solvent, such as a ketone. The precipitated polymer is recovered by filtration. Residual solvent is removed from the polymer by heating same to 60–70° C., preferably under a vacuum. Other well known drying methods may also be used. Recovery of the chlorinated polyisobutylene in a 100 percent yield is not uncommon when the aforedescribed techniques are utilized.

As aforementioned, the physical properties of the chlorinated polyisobutylene depend on its chlorine content. Polymers containing up to about 32 wt. percent chlorine are soft, rubbery, and elastic when prepared in a manner as set forth above. As chlorine content is increased, the polymer becomes harder and less rubbery. At 45–50 wt. percent chlorine the rubbery characteristics almost completely disappear and the material resembles a resinous thermoplastic. This phenomenon is illustrated by the following data in Table I. The data are representative of the results of the chlorination of a polymer of isobutylene ("Vistanex L–100," which has a Staudinger average molecular weight range of approximately 80,000 to 100,000) in carbon tetrachloride solution (containing 4 to 5 wt. percent of polymer) using the aforedescribed chlorinating procedure.

*Table I*

| Chlorination Conditions | | Product | |
|---|---|---|---|
| Reaction time, minutes | Reaction Temp., °C. | Chlorine Content, wt. percent | Characteristics |
| 20 | 50–52 | 19 | Soft, rubbery, elastic. |
| 25 | 55–57 | 24 | Do. |
| 30 | 66–70 | 26 | Do. |
| 60 | 62–65 | 37 | Hard, rubbery. |
| 120 | 65–67 | 45 | Harder, less rubbery. |
| 150 | 55–58 | 48 | Resinous. |

It has unexpectedly been found that free-radical-catalyzed, solution chlorinated polyisobutylene is not suitable for use in our invention. For example, using the chlorination method described above, but employing a free radical producing catalyst, the chlorinated polymers, containing even up to 40% chlorine, are sticky, gelatinous, and lack elasticity. Furthermore, such polymers are discolored and have comparatively poor heat stabilities. As specific examples, Vistanex L–100 in 5% carbon tetrachloride solution was chlorinated using 0.5 part of caprylyl peroxide initiator per 100 parts of polymer in one case, and in another case chlorinated while exposed to ultraviolet radiation. The products, which had a chlorine content of 25 and 40 wt. percent respectively, were non-elastic, gelatinous and sticky; this type of polymer is ineffectual as an impact and processing improver for chlorinated polyvinyl chloride.

The unique post-chlorinated polyvinyl chloride-chlorinated polyisobutylene compositions embodied herein can be physically mixed by any means that produces a homogeneous blend or intimate mixture of the elastomeric and resinous components. Preferred blending apparati include a heated Banbury, or other internal mixer, or a heated roll mill. The mixing apparatus generally is operated at a temperature of from about 310° F. to about 400° F. The fusion-blended mixture may be calendered into sheets, or extruded through small dies and pelletized to produce an easily handled intermediate product. Although the compositions are free of the conventional plasticizers and processing aids, because they are easily molded, extruded, and calendered without them, it is desirable, however, to include in the mixtures small amounts, i.e., 1 to 5 parts per hundred parts by weight of said compositions, of the conventional compounds useful as heat and light stabilizers. Examples of such stabilizers well known in the art are the barium, cadmium, zinc, tin, and lead salts of monocarboxylic acids, and the alkyl derivatives of tin, such as the dialkyl tin mercaptides and thiazoles. The pigments, fillers, lubricants, and other compounding ingredients which are well known in the thermoplastics art also can be included in the compositions embodied herein.

The following specific examples present data which illustrate and clarify the invention but should not be so interpreted as to restrict or limit the invention unnecessarily.

Measured portions of particulate post-chlorinated polyvinyl chloride and representative chlorinated polyisobutylene rubbers were transferred to a six inch diameter, twelve inch long, two roll plastic mill having its rolls maintained at 350° to 400° F. The mill rolls were first closely spaced and the powdery mix passed through the rolls. The stock was fused after several passes, and the milling continued until a smooth rolling bank was attained; this period depended upon the processing characteristics of the blend. The average stock temperature was around 370 to 420° F. The rolls were then opened slightly and a sheet removed from the unit. Samples of this sheet were used to examine the physical (mechanical and thermal) properties of the composition. The tensile strength of the blend was determined by ASTM test method D638–60T, and the impact resistance (Izod) was measured by ASTM method D256–56. The heat distortion or deflection temperature was determined by ASTM method D648–56 using sheets of material 0.125 to 0.150 inch thick.

The performance and characteristics of the mixture during the milling operation demonstrated its relative ease of processability. Its adaptability to roll mill mastication and subsequent sheeting were noted by observing such factors as the time required to form a band on the roll and the quality and uniformity of same, to what degree the plastic formed a smooth rolling feed bank between the rolls, and finally, the texture and appearance of the product sheet.

The density of the post-chlorinated polyvinyl chloride used in the formulations of the examples was 1.56 to 1.57 gms./cc. at 25° C. (i.e., having a chlorine content of about 66 to 67% by weight). Table II, set forth below, tabulates the data pertinent to examples cited that are illustrative of the compositions of our invention.

Table II

| Example No. | Modifier [1] | | Heat Distortion Temperature, ° C. | Tensile, lbs./sq. in. | Izod Impact Value, ft.-lb./inch of notch |
|---|---|---|---|---|---|
| | Chlorine,[2] wt. percent | Pphr.[3] | | | |
| 1 | Control | | 112 | 9,400 | 0.5 |
| 2 | 12 | 5 | 110 | 8,300 | 1.0 |
| 3 | 12 | 10 | 105 | 6,700 | 3.0 |
| 4 | 12 | 15 | 100 | 5,200 | 1.7 |
| 5 | 18 | 5 | 114 | 8,200 | 0.9 |
| 6 | 18 | 10 | 103 | 6,800 | 2.9 |
| 7 | 18 | 15 | 101 | 5,000 | 2.1 |
| 8 | 19 | 5 | 110 | 7,800 | 2.6 |
| 9 | 19 | 10 | 105 | 6,700 | 3.7 |
| 10 | 19.3 | 10 | 105 | 6,400 | 3.0 |
| 11 | 19.3 | 15 | 100 | 5,600 | 1.8 |
| 12 | 23 | 5 | 110 | 8,100 | 1.0 |
| 13 | 23 | 10 | 105 | 6,600 | 5.0 |
| 14 | 23 | 15 | 103 | 4,900 | 1.9 |
| 15 | 24 | 5 | 106 | 8,200 | 1.8 |
| 16 | 24 | 10 | 106 | 7,100 | 5.5 |
| 17 | 26 | 5 | 108 | 8,500 | 1.8 |
| 18 | 26 | 10 | 107 | 6,800 | 3.4 |

[1] Modifier is solution chlorinated Vistanex L-100 (polyisobutylene, average molecular weight range of 80,000–100,000 by Staudinger formula).
[2] Chlorine content is based on total weight of modifier.
[3] Pphr.=parts by weight of modifier per 100 parts by weight of post-chlorinated polyvinyl chloride.

The data show the marked improvement in impact strength of the compositions of our invention when compared with the control resin, post-chlorinated polyvinyl chloride having no chlorinated polyisobutylene mixed therewith. The control resin had an Izod impact value of 0.5 ft.-lb./inch, while the representative blends showed impact values ranging from 1 up to about 5.5 ft.-lbs./inch. The improvements in processability of the blends embodied herein were readily apparent. Specifically, on the roll mill the control polymer required at least eight passes through the rolls in which to form a band, the bank was stiff and not uniform, and the milled sheet had a very rough surface. In contrast, our novel modified compositions exhibited very good milling characterstics, i.e., a uniform band was formed in a minimum number of passes, four or less, the bank was excellent, and a smooth, glossy sheet was recovered.

Generally speaking, the described modification of the post-chlorinated polyvinyl chloride may slightly impair the tensile strength and thermal properties, but not to the extent that the usefulness of the plastic is limited in any way. For instance, a tensile strength of about 5,000 lbs./sq. in. is considered to be somewhat in excess of that required for rigid plastic articles. Blends containing the prescribed maximum amount of chlorinated polyisobutylene rubber, i.e., 15 parts per 100 parts of post-chlorinated polyvinyl chloride, have tensiles approaching this acceptable value. The heat distortion temperatures of the compositions embodied herein are approximately 30° to 50° C. higher than those of the conventional rigid polyvinyl chloride resins and in the most extreme cases are only about 12° C. below those of unmodified post-chlorinated polyvinyl chloride resins. The heat stabilities of our compositions are more than adequate. The heat stability observations were made by subjecting a sample to a temperature of 400° F. in the air and recording the time at which the composition became either brown, black, blistered, "blown-up," or otherwise degraded. Our compositions withstand the extreme effects of these elevated temperatures under oxidizing conditions for a period of from about thirty minutes up to an hour.

The examples presented in Table III, below, illustrate that if the chlorine content of the chlorinated polyisobutylene exceeds the limits disclosed herein, then the blending of same with post-chlorinated polyvinyl chloride does not improve the impact resistance of the base resin (Izod impact value=0.5).

Table III

| Example No. | Modifier[1] | | Heat Distortion Temperature, °C. | Tensile, lbs./sq. in. | Izod Impact Value, ft.-lb./inch of notch |
|---|---|---|---|---|---|
| | Chlorine,[2] wt. percent | Pphr.[3] | | | |
| 19 | 37 | 5 | 103 | 9,000 | 0.6 |
| 20 | 37 | 10 | 102 | 8,600 | 0.5 |
| 21 | 47 | 5 | 101 | 9,400 | 0.5 |
| 22 | 48 | 5 | 101 | 9,400 | 0.5 |
| 23 | 48 | 10 | 96 | 9,600 | 0.6 |

[1] Modifier is solution chlorinated Vistanex L-100.
[2] Chlorine content based on total weight of modifier.
[3] Pphr.=parts by weight of modifier per 100 parts by weight of post-chlorinated polyvinyl chloride.

It is to be understood that the specific embodiments described herein are for the purpose of illustration, and that modifications and variations of the invention are possible and included within the scope of the appended claims.

We claim:

1. A composition comprising an intimate mixture of (a) 100 parts by weight of post-chlorinated polyvinyl chloride having a density of from 1.43 to 1.65 grams per cc. at 25° C., a heat distortion temperature which is at least about 20° C. higher than that of unchlorinated polyvinyl chloride, and a high heat stability such that it is not degraded if exposed to air at 375 to 400° F. for at least 10 minutes, and (b) from about 3 to about 15 parts by weight of a rubbery chlorinated polymer of isobutylene having a chlorine content of from about 12 to about 32 percent by weight selected from the group consisting of chlorinated homopolymers of isobutylene and chlorinated copolymers of isobutylene and which is obtained by the solution chlorination of a polymer of isobutylene containing from 95 to 100 percent by weight of isobutylene constituent and 0 to 5 percent by weight of another monomer constituent copolymerizable with isobutylene selected from the group consisting of styrene, acrylonitrile, methacrylonitrile, methacrylic acid, methyl methacrylate, ethyl methacrylate, butene, butadiene, dimethyl butadiene, chlorobutadiene, piperylene and isoprene, said polymer of isobutylene having a weight average Staudinger molecular weight of from about 8,000 to 200,000 prior to chlorination.

2. The composition according to claim 1 wherein the post-chlorinated polyvinyl chloride has a density of from about 1.53 to 1.59 grams per cc. at 25° C.

3. A composition comprising an intimate mixture of (a) 100 parts by weight of post-chlorinated polyvinyl chloride having a density of from 1.43 to 1.65 grams per cc. at 25° C., a heat distortion temperature which is at least about 20° C. higher than that of unchlorinated polyvinyl chloride, and a high heat stability such that it is not degraded if exposed to air at 375 to 400° F. for at least 10 minutes, and (b) from about 3 to about 15 parts by weight of a rubbery chlorinated polymer of isobutylene having a chlorine content of from about 18 to 26 percent by weight selected from the group consisting of chlorinated homopolymers of isobutylene and chlorinated copolymers of isobutylene and which is obtained by the solution chlorination of a polymer of isobutylene containing from 95 to 100 percent by weight of isobutylene constituent and 0 to 5 percent by weight of another monomer constituent copolymerizable with isobutylene selected from the group consisting of styrene, acrylonitrile, methacrylonitrile, methacrylic acid, methyl methacrylate, ethyl methacrylate, butene, butadiene, dimethyl butadiene, chlorobutadiene, piperylene and isoprene, said polymer of isobutylene having a weight average Staudinger molecular weight of from about 50,000 to 150,000 prior to chlorination.

4. The composition according to claim 3 wherein the post-chlorinated polyvinyl chloride has a density of from about 1.53 to 1.59 grams per cc. at 25° C.

5. The composition according to claim 4 which comprises from about 5 to 10 parts by weight of the rubbery chlorinated polymer of isobutylene and 100 parts by weight of the post-chlorinated polyvinyl chloride.

6. A method for increasing the impact strength and improving the processing characteristics of post-chlorinated polyvinyl chloride having a density within the range of 1.43 to 1.65 grams per cc. at 25° C., a heat distortion temperature which is at least about 20° C. higher than that of unchlorinated polyvinyl chloride, and a high heat stability such that it is not degraded if exposed to air at 375 to 400° F. for at least 10 minutes, which comprises blending with 100 parts by weight of the post-chlorinated polyvinyl chloride from about 3 to about 15 parts by weight of a rubbery chlorinated polymer of isobutylene having a chlorine content of from about 12 to about 32 percent by weight selected from the group consisting of chlorinated homopolymers of isobutylene and chlorinated copolymers of isobutylene, said rubbery polymer obtained by the solution chlorination of a polymer of isobutylene containing from 95 to 100 percent by weight of isobutylene constituent and 0 to 5 percent by weight of another monomer constituent copolymerizable with isobutylene selected from the group consisting of styrene, acrylonitrile, methacrylonitrile, methacrylic acid, methyl methacrylate, ethyl methacrylate, butene, butadiene, dimethyl butadiene, chlorobutadiene, piperylene and isoprene, said polymer of isobutylene characterized by having a weight average Staudinger molecular weight of from about 8,000 to 200,000 prior to chlorination.

References Cited in the file of this patent

UNITED STATES PATENTS

| 2,327,517 | Frolich et al. | Aug. 24, 1943 |
| 3,006,889 | Frey | Oct. 31, 1961 |

UNITED STATES PATENT OFFICE
CERTIFICATE OF CORRECTION

Patent No. 3,145,190                      August 18, 1964

George Gateff et al.

It is hereby certified that error appears in the above numbered patent requiring correction and that the said Letters Patent should read as corrected below.

Column 1, line 18, for "rubber" read -- rubbery --; line 25, for "automative" read -- automotive --; line 44, for "mose" read -- most --; column 2, line 12, for "emebodied" read -- embodied --; line 14, for "375OF." read -- 375° F. --.

Signed and sealed this 22nd day of December 1964.

(SEAL)
Attest:

ERNEST W. SWIDER
Attesting Officer

EDWARD J. BRENNER
Commissioner of Patents